(12) United States Patent
Boese (10) Patent No.: US 8,777,290 B1
(45) Date of Patent: Jul. 15, 2014

(54) VEHICLE DASHBOARD INSTRUMENT ASSEMBLY

(71) Applicant: Boese Engineering, Tempe, AZ (US)

(72) Inventor: Donna J. Boese, Tempe, AZ (US)

( * ) Notice: Subject to any disclaimer, the term of this patent is extended or adjusted under 35 U.S.C. 154(b) by 1 day.

(21) Appl. No.: 13/787,064

(22) Filed: Mar. 6, 2013

(51) Int. Cl.
  *B62D 25/14* (2006.01)
  *B60K 37/02* (2006.01)

(52) U.S. Cl.
  CPC ....................................... *B60K 37/02* (2013.01)
  USPC .............................. 296/70; 180/90; 248/27.1

(58) Field of Classification Search
  USPC ............ 296/70; 180/90; 248/27.1, 115, 309.1
  See application file for complete search history.

(56) References Cited

U.S. PATENT DOCUMENTS

| | | | | |
|---|---|---|---|---|
| 1,727,632 A * | 9/1929 | Champion et al. | ............... | 362/23 |
| 2,246,849 A * | 6/1941 | Hough | ........................ | 116/202 |
| 2,280,127 A * | 4/1942 | Morton et al. | ............ | 192/105 C |
| 2,423,597 A * | 7/1947 | Hurn | ................ | 180/90 |
| 2,607,228 A * | 8/1952 | Coxon | ........................ | 73/715 |
| 3,040,338 A * | 6/1962 | Zeleny et al. | ................ | 248/27.1 |
| 3,093,002 A * | 6/1963 | Logan et al. | .................... | 73/431 |
| 3,161,062 A * | 12/1964 | Huston | ........................ | 73/431 |
| 3,241,794 A * | 3/1966 | Little | ........................ | 248/27.1 |
| 3,287,980 A * | 11/1966 | Gilliland | ........................ | 73/493 |
| 3,911,855 A * | 10/1975 | Haven | .................... | 340/457.4 |
| 4,352,401 A * | 10/1982 | Vitaloni | ........................ | 180/90 |
| 4,507,706 A * | 3/1985 | Trexler, Jr. | .................... | 361/600 |
| 4,920,799 A * | 5/1990 | Low | ........................ | 73/431 |
| 5,813,636 A * | 9/1998 | Lollis | ........................ | 248/27.1 |
| 5,825,338 A * | 10/1998 | Salmon et al. | .................... | 345/7 |
| 5,971,558 A * | 10/1999 | Peel | ........................ | 362/26 |
| 6,244,107 B1 * | 6/2001 | Nelson et al. | .................... | 73/431 |
| 6,729,738 B2 * | 5/2004 | Fuwausa et al. | ................ | 362/84 |
| 6,938,859 B2 * | 9/2005 | Beausoleil | .................... | 248/27.1 |
| 6,938,865 B1 * | 9/2005 | Day | ........................ | 248/229.14 |
| 7,038,864 B2 * | 5/2006 | Rose | .................... | 359/819 |
| 7,243,882 B2 * | 7/2007 | Day et al. | .................... | 248/27.1 |
| 7,293,456 B1 * | 11/2007 | Trogdon | .................... | 73/178 R |
| 7,325,775 B2 * | 2/2008 | Chen | .................... | 248/27.1 |
| 7,401,835 B2 * | 7/2008 | Gresham et al. | ................ | 296/70 |
| 7,472,940 B2 * | 1/2009 | Sullivan | .................... | 296/72 |
| 7,474,204 B2 * | 1/2009 | Songwe, Jr. | .................... | 340/461 |
| 7,832,699 B2 * | 11/2010 | Johnson | .................... | 248/316.1 |
| 2002/0008631 A1 * | 1/2002 | Ross | .................... | 340/815.4 |
| 2005/0253409 A1 * | 11/2005 | Sato et al. | .................... | 296/70 |
| 2006/0146542 A1 * | 7/2006 | Sullivan | .................... | 362/362 |
| 2008/0211652 A1 * | 9/2008 | Cope et al. | .................... | 340/461 |
| 2009/0057496 A1 * | 3/2009 | Johnson | .................... | 248/27.1 |
| 2009/0090756 A1 * | 4/2009 | Day et al. | .................... | 224/483 |
| 2012/0153656 A1 * | 6/2012 | Casey et al. | .................... | 296/1.08 |

* cited by examiner

*Primary Examiner* — Lori Lyjak (74) *Attorney, Agent, or Firm* — Parsons & Goltry; Michael W. Goltry; Robert A. Parsons (57) ABSTRACT

A vehicle dashboard instrument assembly includes a gauge faceplate having front and rear faces and a gauge-receiving opening extending through the gauge faceplate from the front face to the rear face, a gauge, a bracket, and a collar. The collar is applied directly against the front face of the gauge faceplate to encircle the gauge-receiving opening, a front end of the gauge is applied to the gauge-receiving opening to locate an outer rim of the gauge directly against the collar, and locate a measurement display of the gauge for viewing near the gauge-receiving opening. The gauge extends rearwardly from the rear face of the gauge faceplate to the rear end of the gauge, and the bracket is coupled between the gauge and the rear face of the gauge faceplate to clamp the collar between the outer rim of the gauge and the front face of the gauge faceplate.

11 Claims, 9 Drawing Sheets

FIG. 8

VEHICLE DASHBOARD INSTRUMENT ASSEMBLY

FIELD OF THE INVENTION

The present invention relates to vehicles and, more particular, to dashboard gauge assemblies for vehicles, such as automobiles and boats.

BACKGROUND OF THE INVENTION

A dashboard, also called a dash, an instrument panel, or a fascia, is a control panel placed in front of the driver of a vehicle, such as an automobile or a boat, housing instrumentation and controls for the operation of the vehicle. Items located on the dashboard include the steering wheel and the instrument cluster. An instrument cluster contains gauges such as a speedometer gauge, tachometer gauge, odometer gauge, temperature gauge, oil pressure gauge, voltmeter gauge, and fuel gauge, and also indicators such as gearshift position, seat belt warning light, parking-brake-engagement warning light, an engine-malfunction light, as a matter of example. In the 1940s through the 1960s, American vehicle manufacturers and their imitators designed unusually-shaped and instruments on a dashboard laden with stylish chrome and transparent plastic. Since the 1960's, dashboard instruments have become increasingly less stylish, particularly with the implementation of digital readouts. However, there is a continued demand for stylish dashboard instrumentation and there are a handful of aftermarket manufacturers of vehicle accessories that provide such products. Nevertheless, this demand has waned over recent years due to relatively little improvement in field of aftermarket dashboard instrumentation designs and assemblies. Accordingly, there is a need in the art for a dashboard instrumentation assembly that is easy to assemble and install and that may be configured into different design configurations.

SUMMARY OF THE INVENTION

According to the principle of the invention, a vehicle dashboard instrument assembly includes a gauge faceplate, a gauge, and a collar. The gauge faceplate includes a front face, a rear face, and a gauge-receiving opening through the gauge faceplate from the front face to the rear face. The gauge includes a front end, having a measurement display and an outer rim encircling a viewing area to the measurement display, and a rear end. The collar has an inner side directly abutting the front face of the gauge faceplate outboard of the gauge-receiving opening, and an outer side. The front end of the gauge is applied to the gauge-receiving opening, the outer rim of the gauge directly abuts the outer side of the collar, the measurement display is located for viewing in a direction toward the front face of the gauge faceplate, and the gauge extends rearwardly from the rear face of the gauge faceplate from the front end of the gauge applied to the gauge-receiving opening to the rear end of the gauge. A bracket is removably connected between the gauge and the rear face of the gauge faceplate so as to clamp the collar between the outer rim of the gauge and the front face of the gauge faceplate, and the collar decoratively encircles the outer rim of the gauge. The bracket encircles the gauge between the rear face of the gauge faceplate and the rear end of the gauge.

According to the principle of the invention, a vehicle dashboard instrument assembly includes a gauge faceplate and a gauge assembly. The gauge faceplate includes a front face, a rear face, and a gauge-receiving opening through the gauge faceplate from the front face to the rear face. The gauge assembly includes a bracket, a collar having an inner side and an outer side, and a gauge. The gauge includes a front end, having a measurement display and an outer rim encircling a viewing area to the measurement display, and a rear end. The gauge assembly is configurable in first and second display configurations in relation to the gauge faceplate. The first display configuration of the gauge assembly includes the an inner side of the collar directly abutting the front face of the gauge faceplate outboard of the gauge-receiving opening, the front end of the gauge applied to the gauge-receiving opening, the outer rim of the gauge directly abutting the outer side of the collar, the measurement display located for viewing in a direction toward the front face of the gauge faceplate, the gauge extends rearwardly from the rear face of the gauge faceplate from the front end of the gauge applied to the gauge-receiving opening to the rear end of the gauge, the bracket removably connected between the gauge and the rear face of the gauge faceplate so as to clamp the collar between the outer rim of the gauge and the front face of the gauge faceplate, and the collar decoratively encircles the outer rim of the gauge. The second display configuration of the gauge assembly includes the front end of the gauge applied to the gauge-receiving opening, the outer rim of the gauge directly abutting the front face of the gauge faceplate outboard of the gauge-receiving opening, the measurement display located for viewing in a direction toward the front face of the gauge faceplate, the gauge extends rearwardly from the rear face of the gauge faceplate from the front end of the gauge applied to the gauge-receiving opening to the rear end of the gauge, and the bracket removably connected between the gauge and the rear face of the gauge faceplate so as to clamp down the outer rim of the gauge against the front face of the gauge faceplate outboard of the gauge-receiving opening. The bracket encircles the gauge between the rear face of the gauge faceplate and the rear end of the gauge when the bracket is removably connected between the gauge and the rear face of the faceplate.

According to the principle of the invention, a vehicle dashboard instrument assembly includes a gauge faceplate, a gauge, a collar, and a bracket. The gauge faceplate includes a front face, a rear face, and a gauge-receiving opening through the faceplate from the front face to the rear face. The gauge includes a front end, having a measurement display and an outer rim encircling a viewing area to the measurement display, and a rear end. The collar has an inner side directly abutting the front face of the gauge faceplate outboard of the gauge-receiving opening, and an outer side, and the bracket includes an inner extremity and an outer extremity. The front end of the gauge is applied to the gauge-receiving opening, the outer rim of the gauge directly abuts the outer side of the collar, the measurement display is located for viewing in a direction toward the front face of the faceplate, and the gauge extends rearwardly from the rear face of the gauge faceplate from the front end of the gauge applied to the gauge-receiving opening to the rear end of the gauge. The inner extremity of the bracket is applied directly against the rear face of the gauge faceplate on either side of the gauge and extends rearwardly from the rear face of the gauge faceplate past the rear end of the gauge to the outer extremity of the bracket, which is removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the outer side of the collar in a direction that is toward and orthogonal with respect to the front face of the gauge faceplate, to clamp the collar between the outer rim of the gauge and the front face of the gauge faceplate. The collar decoratively encircles the outer rim of the gauge. The outer extremity of the bracket is removably connected to the rear end of the gauge with an engagement assembly. The engagement assembly includes openings formed in the outer extremity of the bracket, threaded posts each extending rearwardly from the rear end of the gauge to a free, and threaded nuts. The free ends of the threaded posts are applied into and through the openings formed in the outer extremity of the bracket, and each of the threaded nuts is threaded onto one of the threaded posts and is tightened against the outer extremity of the bracket. The inner extremity of the bracket encircles the gauge between the rear face of the gauge faceplate and the rear end of the gauge.

According to the principle of the invention, a vehicle dashboard instrument assembly includes a gauge faceplate and a gauge assembly. The gauge faceplate includes a front face, a rear face, and a gauge-receiving opening through the gauge faceplate from the front face to the rear face. The gauge assembly includes a bracket having an inner extremity and an outer extremity, a collar having an inner side and an outer side, and a gauge. The gauge includes a front end, having a measurement display and an outer rim encircling a viewing area to the measurement display, and a rear end. The gauge assembly is configurable in first and second display configurations in relation to the gauge faceplate. The first display configuration of the gauge assembly includes the an inner side of the collar directly abutting the front face of the gauge faceplate outboard of the gauge-receiving opening, the front end of the gauge applied to the gauge-receiving opening, the outer rim of the gauge directly abutting the outer side of the collar, the measurement display located for viewing in a direction toward the front face of the gauge faceplate, the gauge extends rearwardly from the rear face of the gauge faceplate from the front end of the gauge applied to the gauge-receiving opening to the rear end of the gauge, the inner extremity of the bracket is applied directly against the rear face of the gauge faceplate on either side of the gauge and extends rearwardly from the rear face of the gauge faceplate past the rear end of the gauge to the outer extremity of the bracket removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the outer side of the collar in a direction that is toward and orthogonal with respect to the front face of the gauge faceplate, to clamp the collar between the outer rim of the gauge and the front face of the gauge faceplate, and the collar decoratively encircles the outer rim of the gauge. The second display configuration of the gauge assembly includes the front end of the gauge applied to the gauge-receiving opening, the outer rim of the gauge directly abutting the front face of the gauge faceplate outboard of the gauge-receiving opening, the measurement display located for viewing in a direction toward the front face of the gauge faceplate, the gauge extends rearwardly from the rear face of the gauge faceplate from the front end of the gauge applied to the gauge-receiving opening to the rear end of the gauge, and the inner extremity of the bracket is applied directly against the rear face of the gauge faceplate on either side of the gauge and extends rearwardly from the rear face of the gauge faceplate past the rear end of the gauge to the outer extremity of the bracket removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the front face of the gauge faceplate outboard of the gauge-receiving opening in a direction that is toward and orthogonal with respect to the front face of the gauge faceplate, to clamp down the outer rim of the gauge against the front face of the gauge faceplate outboard of the gauge-receiving opening. There is an engagement for removably connecting the outer extremity of the bracket to the rear end of the gauge. The engagement assembly includes openings formed in the outer extremity of the bracket, threaded posts each extending rearwardly from the rear end of the gauge to a free, and threaded nuts, and when the engagement assembly removably connects the outer extremity of the bracket to the rear end of the gauge, the free ends of the threaded posts are applied into and through the openings formed in the outer extremity of the bracket, and each of the threaded nuts is threaded onto one of the threaded posts and is tightened against the outer extremity of the bracket.

BRIEF DESCRIPTION OF THE DRAWINGS

Referring to the drawings.

DETAILED DESCRIPTION

Figure 1:
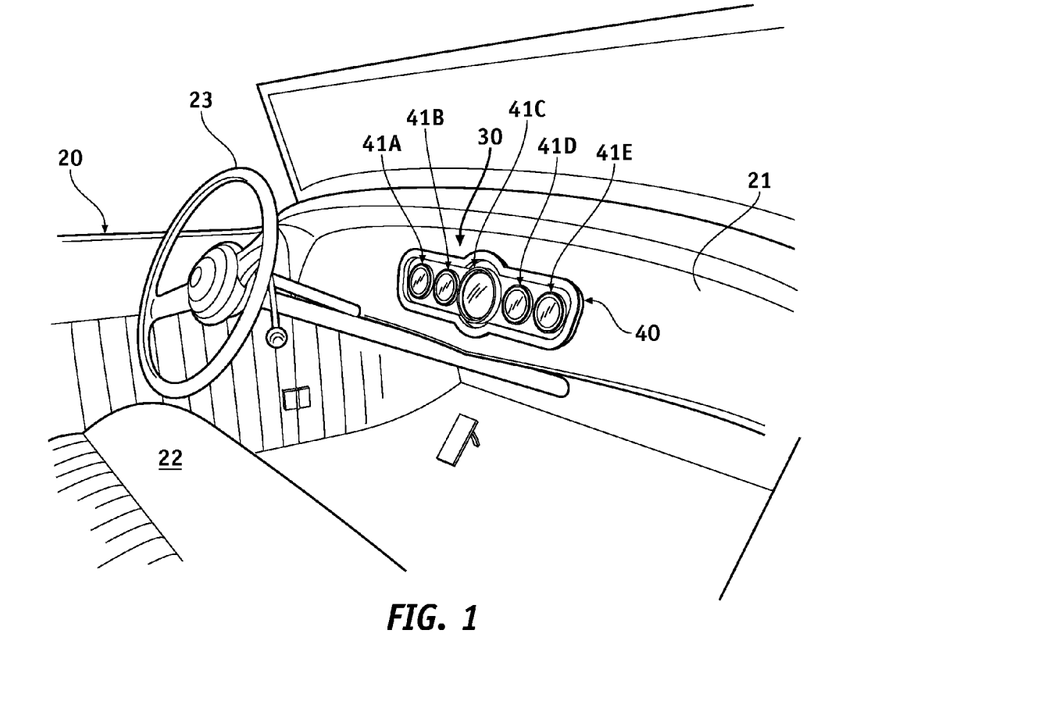
FIG. 1 is a fragmented perspective view a vehicle including a dashboard and a dashboard instrument assembly installed in the dashboard, the dashboard instrument assembly constructed and arranged in accordance with the principle of the invention.

Turning now to the drawings, in which like reference characters indicate corresponding elements throughout the several views, attention is first directed to FIG. 1 in which there is seen a fragmented perspective view a vehicle 20 including a dashboard 21 and a dashboard instrument assembly 30 installed in dashboard 21. Dashboard 21 and dashboard instrument assembly 30 face the driver/passenger compartment 22 of vehicle 20, and there is a steering wheel 23 that extends into compartment 22 for use by an operator in driving vehicle 20 in the normal manner. Dashboard instrument assembly 30 is constructed and arranged in accordance with the principle of the invention and provides instrumentation for the operation of vehicle 20. Vehicle 20 is intended to be generally representative of a typical transport or passenger vehicle, such as a motorized car, truck, bus, or the like. Further details of vehicle 20 not specifically illustrated and described will be readily understood and appreciated by those skilled in the art. Although dashboard instrument assembly 30 is shown and described in connection with the dashboard of a typical transport or passenger vehicle, dashboard instrument assembly 30 may be incorporated into dashboards of other types of vehicles, such as boats, tracked vehicles, and the like.

Figure 2:
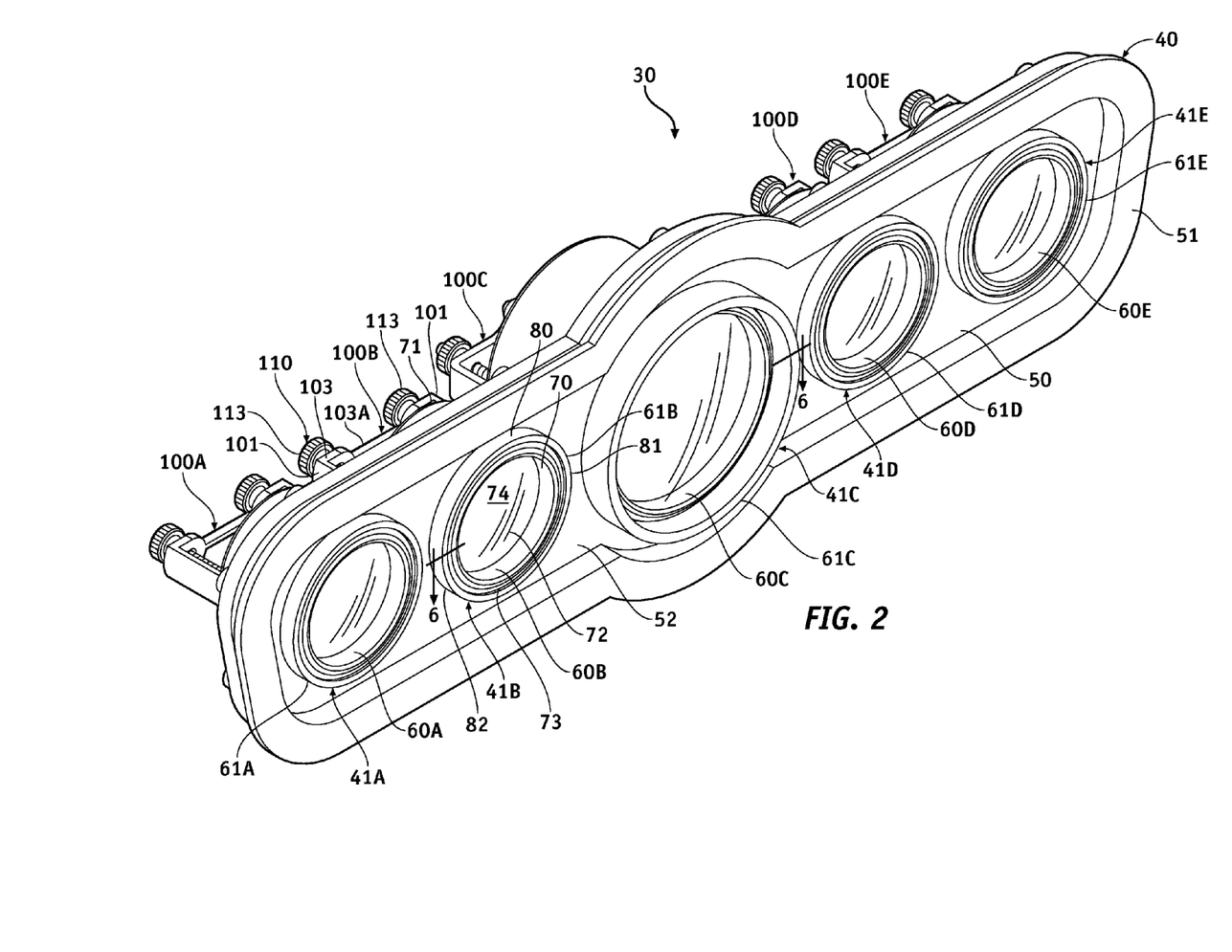
FIG. 2 is a front perspective view of the dashboard instrument assembly of FIG. 1 shown as it would appear in a first display configuration.
Figure 3:
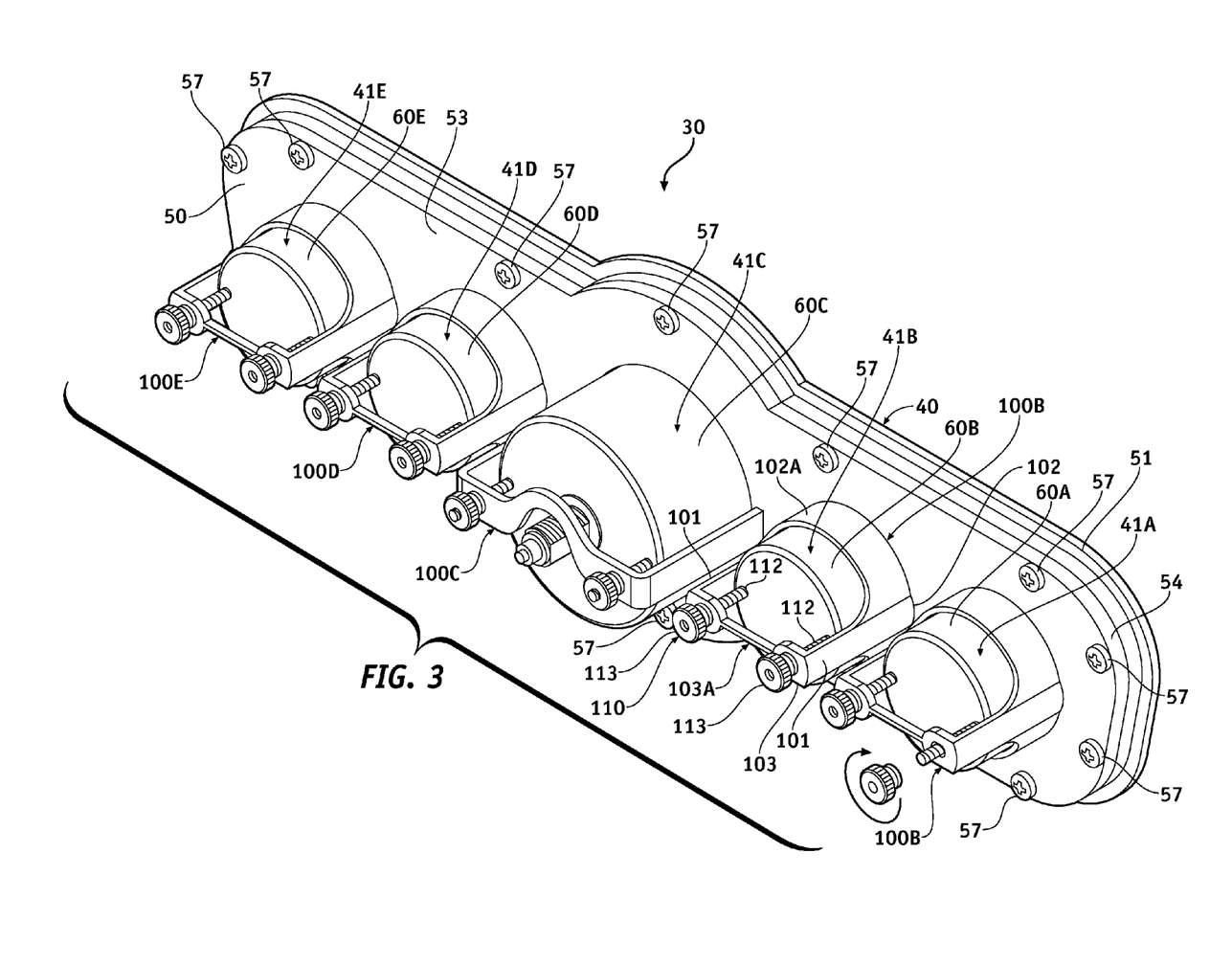
FIG. 3 is a rear perspective view of the dashboard instrument assembly of FIG. 1.
Figure 4:
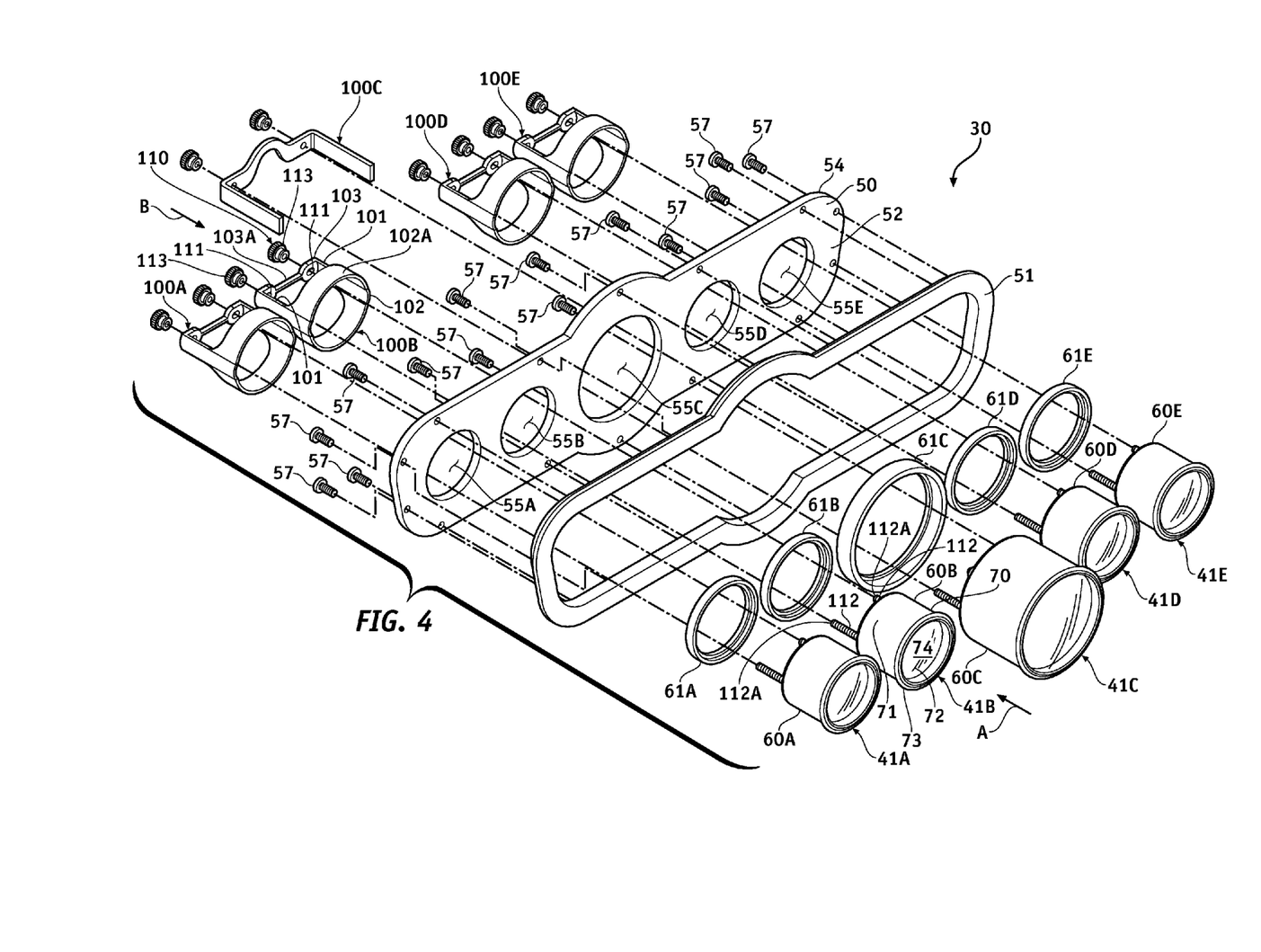
FIG. 4 is a front explosion view of the dashboard instrument assembly of FIG. 1.
Figure 5:
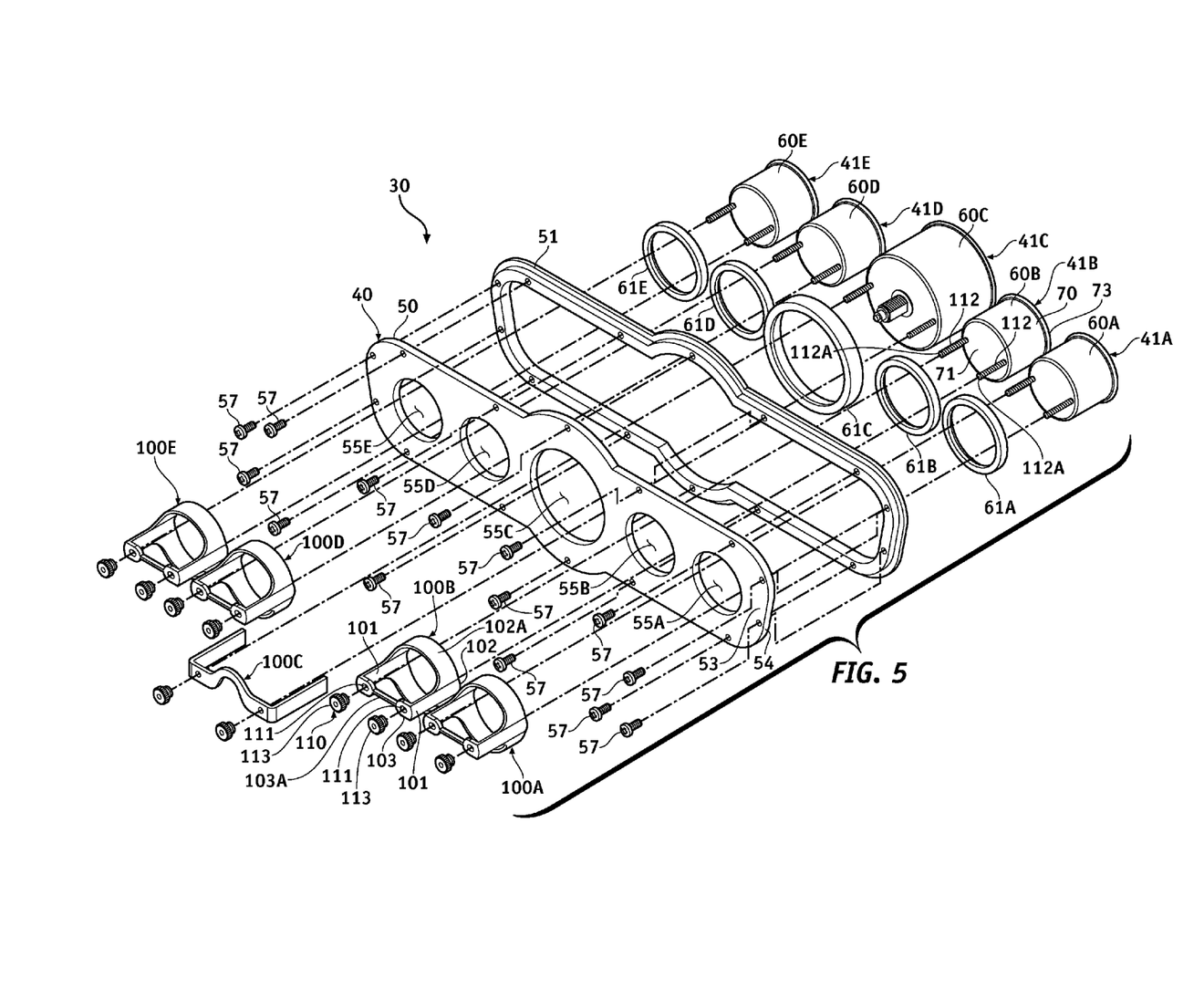
FIG. 5 is a rear explosion view of the dashboard instrument assembly of FIG. 1.

FIGS. 2 and 3 are front and rear perspective views, respectively, of dashboard instrument assembly 30, which is self-contained and shown as it would appear assembled prior to installation into dashboard 21. FIGS. 4 and 5 are front and rear exploded views, respectively, of dashboard instrument assembly 30 shown as it would appear disassembled. Referring to FIGS. 2-5 in relevant part, dashboard instrument assembly 30 includes a gauge faceplate assembly 40, and gauge assemblies 41. Gauge faceplate assembly 40 consists of a gauge faceplate 50 and a frame 60. Faceplate 50 is broad and flat and is formed of aluminum, steel, wood, plastic, or other material or combination of materials having the properties of rigidity, resilience, and impact resistance. Faceplate 50 is preferably integrally formed, such is through molding or machining, and may be formed of a plurality of parts attached via welding or other joinery if desired. Faceplate 50 has a front or outer face 52, a rear or inner face 53, a marginal perimeter edge 54, and gauge-receiving openings 55. Marginal perimeter edge 54 defines the contour of faceplate 50, namely, the outline of faceplate 50, or in other words the edge or line that defines or bounds the shape of faceplate 50. In the present embodiment, faceplate 50 is generally rectangular in shape with an enlarged waist or mid-section, characterized in that it has diametrical opposed, partially spheroidal bulbs on the upper and lower sides, as illustrated. Faceplate 50 can be formed in other shapes, such as square, round, crescent-shaped, oblong, or other selected shape, and it may incorporate combinations of geometric shapes if so desired without departing from the invention.

Gauge-receiving openings 55 are spaced-apart, and extend through gauge faceplate 50 from front face 52 to rear face 53. Gauge-receiving openings 55 receive gauge assemblies 41. Gauge-receiving openings 55 are arranged in a pattern, which, in this embodiment is a linear horizontal row. The pattern of gauge-receiving openings 55 determines that arrangement of gauge assemblies 41 when they are installed with gauge faceplate 50, and other patterns for gauge-receiving openings 55 can be used depending on the desired or preferred arrangement of gauge assemblies 41 without departing from the invention. Gauge-receiving openings 55 receive the gauges of gauge assemblies 41. As such, gauge-receiving openings 55 and the cross-sectional shape of the gauges of gauge assemblies 41 applied to gauge-receiving openings 55 have corresponding shapes. In the present embodiment, gauge-receiving openings 55 are circular in the present embodiment so as to correspond to the circular cross-sectional shape of the portions of gauges of the gauge assemblies 41 to be applied to gauge-receiving openings 55.

Frame 51 is preferably integrally formed, such is through molding or machining, and may be formed of a plurality of parts attached via welding or other joinery if desired. Faceplate 50 and frame 51 are preferably formed of the same material or combination of materials. Frame 51 is a continuous rim or border and has a size and shape that relates to the contour of marginal perimeter edge 55. Frame 51 is applied directly against front face 52 of faceplate 50 and runs flush along the contour of faceplate 50 defined by marginal perimeter edge 54, and frame 51 is removably connected to faceplate 50 with fasteners 57. Fasteners 57 are threaded fasteners in the present embodiment, and are applied to openings formed through faceplate 50 in a direction from rear face 53 of faceplate 50 and then into corresponding threaded openings formed in frame 51 and are tightened down via rotation so as to tighten down frame 51 against front face 52 of faceplate 50 just inboard of marginal perimeter edge 54, and removably connect frame 51 directly against front face 52 of faceplate 50 along marginal perimeter edge 54. Frame 51 is decorative in nature and decoratively frames faceplate 50 along marginal perimeter edge 54.

Gauge assemblies 41 are identical in that they each include a gauge 60 and a collar 61. There are five gauge assemblies 41A-41E in dashboard instrument assembly 30, and dashboard instrument assembly 30 can incorporate more or less such gauge assemblies as may be desired. Gauges 60 of gauge assemblies 41A-41E perform different instrument functions. Gauge assembly 41A is installed with gauge-receiving opening 55A, gauge assembly 41A is installed with gauge-receiving opening 55A, gauge assembly 41B is installed with gauge-receiving opening 55B, gauge assembly 41C is installed with gauge-receiving opening 55C, gauge assembly 41D is installed with gauge-receiving opening 55D, and gauge assembly 41E is installed with gauge-receiving opening 55E. As a matter of example, gauge 60A of gauge assembly 41A is a fuel gauge, gauge 60B of gauge assembly 41B is a water temperature gauge, gauge 60C of gauge assembly 41C is a speedometer gauge that incorporates an odometer gauge, gauge 60D of gauge assembly 41D is an oil pressure gauge, and gauge 60E of gauge assembly 41E is a voltmeter gauge. Other gauges can be used, as intimated above, and these gauge types are set forth as a matter of illustration and description. In this embodiment, gauge 60C of gauge assembly 41C is somewhat larger than gauges 60A, 60B, 60D, and 60E, which are each equal in size and shape. For clarity, reference numeral 61A denotes the collar for gauge assembly 41A, reference numeral 61B denotes the collar for gauge assembly 41B, reference numeral 61C denotes the collar for gauge assembly 41C, reference numeral 61D denotes the collar for gauge assembly 41D, and reference numeral 61E denotes the collar for gauge assembly 41E. Gauges 60A-60E are of a type found under the trademark AUTO METER®, and are well-known and illustrated only generally in FIGS. 1-8 and are neither illustrated nor discussed in detail. Apart from the measurement characteristics of their respective gauges 60A-60E, gauge assemblies 41A-41E are identical in structure and function, and only gauge assembly 41B is discussed in detail, with the understanding that the ensuing discussion of gauge assembly 41B applies to each of gauge assemblies 41A and 41C-41E, unless otherwise indicated.

Figure 6:
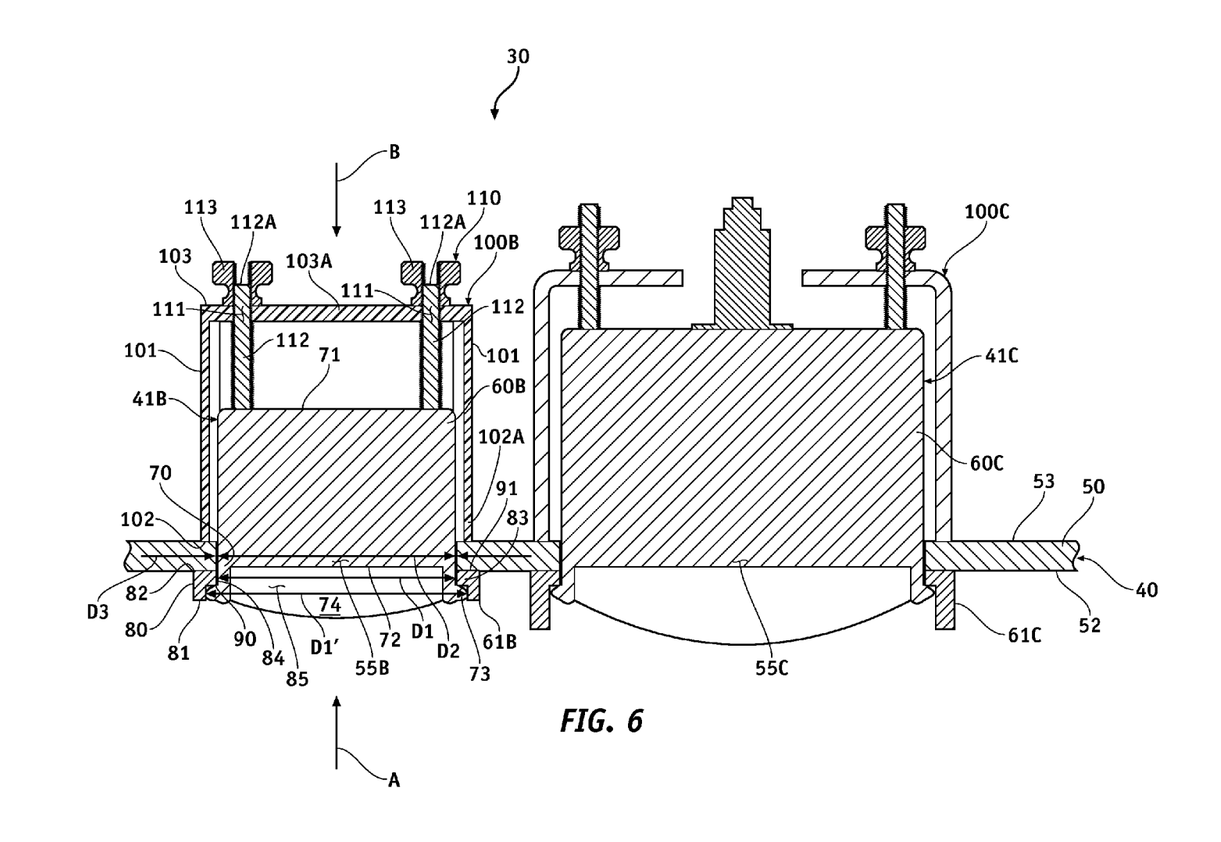
FIG. 6 is a section view taken along line 6-6 of FIG. 2.

Referring in relevant part to FIGS. 4-6, gauge 60B includes a front end 70 and a rear end 71. Front end 70 has a measurement display 72, such as an analog display or a digital display in an alternate embodiment, for displaying the measurement information of gauge 60B, which in this instance is water temperature, and an outer rim 73 encircling a viewing area 74 to measurement display 72. In this example, outer rim 73 is the customary retaining outer rim typical of vehicle instruments, such as speedometers, tachometers, water temperature gauges, etc. Outer rim 73 is circular and is a flange, which projects radially outwardly from viewing area 74, as illustrated.

Collar 61B is circular and is preferably integrally formed, such is through molding or machining, and may be formed of a plurality of parts attached via welding or other joinery if desired. Collar 61B is preferably formed of the same material or combination of materials for faceplate 50 and frame 51. Collar 61B is a continuous band, which in use is applied directly against front face 52 of faceplate 50 around gauge-receiving opening 55B, and is sandwiched directly between outer rim 73 of gauge 60B and front face 52 of faceplate 50 in the installation of gauge assembly 41B so as to decoratively encircle/frame outer rim 73 of gauge 60B.

Figure 6A:
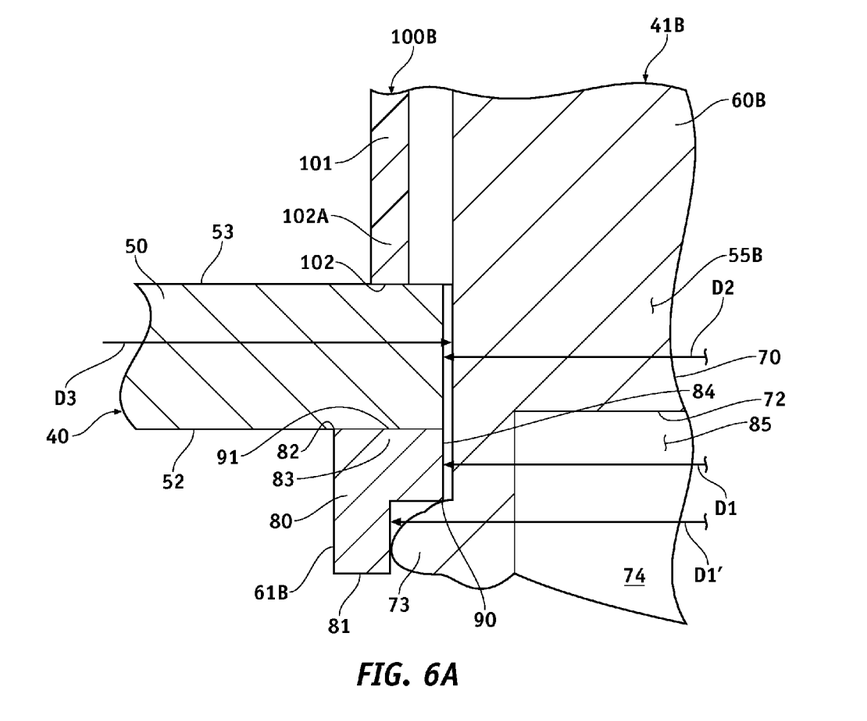
FIG. 6A is an enlarged section view illustrating the application of a collar between an outer rim of a gauge assembly and the front face of a faceplate of the dashboard instrument assembly of FIG. 1.

Referring in relevant part to FIGS. 6 and 6A, collar 61B encircles an opening 85, which is circular, and consists of an upstanding sidewall 80 that is continuous and that has an outer end 81 and an opposed inner end 82, and a flange 83 that is continuous and that extends inwardly from inner end 82 to an inner edge 84. Sidewall 80 and flange 83 are orthogonal with respect to each other, in which sidewall 80 and flange 83 extend in perpendicular directions. Flange 83 is continuous and defines an inner diameter D1 of opening 85 through collar 61B. Sidewall 80 is continuous, as previously described, and defines an inner diameter D1' of opening 85 through collar 61B. Inner diameter D1 of opening 85 is equal to inner diameter D2 of gauge-receiving opening 55B through faceplate 50, and inner diameter D1' of opening is somewhat larger than inner diameter D1 of opening 85 and inner diameter D2 of gauge-receiving opening 55B. Collar 61B has an outer side or surface denoted at 90, and an inner side or surface denoted at 91. Outer side 90 forms a part of flange 83, and extends from sidewall 80 to inner edge 84. Inner side 91 forms are part of sidewall 80 and flange 83, and extends from inner end 82 of sidewall 80 to inner edge 84.

In the installation of collar 61B between front surface 52 of faceplate 50 and gauge 60B, inner side 91 of collar 61B is applied directly against front face 52 of faceplate 50 in the direction of arrowed line A in FIG. 4 and FIG. 6 outboard of gauge-receiving opening 55B as shown in FIG. 6 so as to directly contact or otherwise abut front face 52 of faceplate 50 outboard of gauge-receiving opening 55B, and collar 61B is located so as to align inner diameter D1 of collar 61B with inner diameter D2 of gauge-receiving opening 55B making openings 55B and 85 coaxial. With inner side 91 of collar 61B directly abutting front face 52 of faceplate 50 outboard of gauge-receiving opening 55B in this way, collar 61B extends outwardly from inner side 91 in direct contact with front face 52 of faceplate 50 to outer side 90 and outer end 81 of sidewall 80. Gauge 60B is applied rear end 71 first into and through openings 85 and 55B in the direction of arrowed line A in FIGS. 4 and 6. Gauge 60B has an outer diameter D3 from outer rim 73 of front end 70 to rear end 71 that is circular and also somewhat less than inner diameters D1 and D2 of openings 85 and 55B, respectively, which permits gauge 60B to be passed into and through openings 85 and 55B rear end 71 first in the direction of arrowed line A, until front end 70 of gauge 60B is applied to opening 55B and outer rim 73, which confronts outer side 90 of flange 83 and extends outwardly in the opposite direction of outer rim 73 of gauge 60B, passes beyond outer end 81 of continuous sidewall 80 within inner diameter D1' of opening 85 encircled by sidewall 80 and makes direct contact with, and is seated directly against, outer side 90 of flange 83 of collar 61B at inner diameter D1' of opening 85, as is illustrated in FIG. 6 and also FIG. 6A. The direct contact between outer rim 73 of front end 70 of gauge 60B and outer side 90 of flange 83 of collar 61B prevents further movement of gauge 60B in the direction of arrowed line A. In this installation of collar 61B and gauge 60B with respect to gauge-receiving opening 55B, continuous sidewall 80 decoratively encircles/frames outer rim 73 of gauge 60B at front face 52 of faceplate 50, as is shown in FIGS. 2 and 6. And so in this described display configuration of gauge assembly 41B, inner side 91 of collar directly abuts front face 52 of faceplate 50 outboard of gauge-receiving opening 55B, front end 70 of gauge 60B is applied to gauge-receiving opening 55B, outer rim 73 of gauge 60B is located within inner diameter D1' of opening 85 and directly abuts/contacts outer side 90 of flange 83 of collar 61B, measurement display 72 is located for viewing via viewing area 74 in a direction of arrowed line A toward front face 52 of faceplate 50, and gauge 60B extends rearwardly from rear face 53 of faceplate 50 from front end 70 of gauge 60B applied to gauge-receiving opening 55B to rear end 71 of gauge 60B, and continuous sidewall 80 of collar 61B decoratively encircles, surrounds, or otherwise frames outer rim 73 of front end 70 of gauge 60B along front face 52 of faceplate 50 so as to present a decorative display configuration of gauge assembly 41B relative to front face 52 of faceplate 50, in accordance with the principle of the invention. To complete this installation of gauge assembly 41B and to secure gauge 60B and collar 61B in place to faceplate 50, a bracket 100 is removably connected between gauge 60B and rear face 53 of faceplate 50 so as to clamp collar 61B between outer rim 73 of gauge 60B and front face 52 of faceplate 50. For clarity, reference numeral 100A denotes the bracket for gauge assembly 41A, reference numeral 100B denotes the bracket for gauge assembly 41B, reference numeral 100C denotes the bracket for gauge assembly 41C, reference numeral 110D denotes the bracket for gauge assembly 41D, and reference numeral 100E denotes the bracket for gauge assembly 41E.

Looking now in relevant part to FIGS. 3-6, bracket 100B is fashioned of aluminum, steel, wood, plastic, or other material or combination of materials having the properties of rigidity, resilience, and impact resistance, and has opposed, parallel arms 101 that extend between, and define, an inner extremity 102 and an opposed outer extremity 103. To install bracket 100B, inner extremity 102 of arms 101 of bracket 100B is applied directly against rear face 53 of faceplate 50 in the direction of arrowed line B in FIGS. 4 and 6 on either side of gauge 60B, whereby bracket 100B extends rearwardly from inner extremity 102 and rear face 53 of faceplate 50 past rear end 71 of gauge 60B to outer extremity 103 of arms 101 of bracket 100B, which are connected via a bridge or transom 103A extending therebetween which is considered a part of outer extremity 103, and outer extremity 103 of arms 101 of bracket 100B is removably connected to gauge 60B so as to tighten inner extremity 102 of arms 101 of bracket 100B against rear face 53 of faceplate 50 in a direction that is toward and orthogonal with respect to rear face 53 of faceplate 50 in the direction of arrowed line B in FIGS. 4 and 6, and tighten outer rim 73 of gauge 60B against outer side 90 of flange 83 of collar 61B in a direction that is toward and orthogonal with respect to front face 52 of faceplate 50 in the direction of arrowed line A in FIGS. 4 and 6, to clamp collar 61B between outer rim 73 of gauge 60B and front face 52 of faceplate 50. In the present embodiment, inner extremity 102 of bracket 100B is formed with a circular collar 102A, which is formed in arms 101. This circular collar 102A of bracket 100B encircles gauge 60B, as is shown in FIGS. 3 and 6, between rear face 53 of faceplate 50 and rear end 71 of gauge 60B in the installation of bracket 100B removably connected between rear face 53 of faceplate 50 and gauge 60B as herein specifically described. Bracket 100C used in connection with gauge assembly 41C does not have a circular collar as is described in connection with bracket 100B of gauge assembly 41B, but is otherwise structurally the same as bracket 100B.

Outer extremity 103 of arms 101 of bracket 100B is preferably removably connected to rear end 71 of gauge 60B. An engagement assembly 110 is provided to removably connect outer extremity 103 of arms 101 of bracket 100B to gauge 60B, and, preferably, to rear end 71 of gauge 60B. In the present embodiment in reference in relevant part to FIGS. 4-6, engagement assembly 110 includes openings 111 formed in outer extremity 103 of arms 101 of bracket 100B, threaded posts 112 each extending rearwardly from rear end 71 of gauge 60B to a free 112A, and threaded nuts 113. Free ends 112A of threaded posts 112 are applied into and through openings 111 formed in outer extremity 103 of arms 101 of bracket 100B, and threaded nuts 113 are threaded onto the respective free ends 112A of threaded posts 112 and are then tightened via rotation against outer extremity 103 of arms 101 of bracket 100B so as to concurrently tighten inner extremity 102 of bracket 100B against rear face 53 of faceplate 50 in a direction that is toward and orthogonal with respect to rear face 53 of faceplate 50 in the direction of arrowed line B in FIGS. 4 and 6, and tighten outer rim 73 of gauge 60B against outer side 90 of flange 83 of collar 61B in a direction that is toward and orthogonal with respect to front face 52 of faceplate 50 in the direction of arrowed line A in FIGS. 4 and 6. To remove bracket 100B and remove gauge assembly 41B, one need on only reverse the above-described installation procedures for gauge assembly 41B and bracket 100B. FIG. 2 illustrates dashboard instrument assembly 30 as it would appear with gauge assemblies 40A-40E installed in the above-described display configuration, including gauges 60A-60E installed with their respective collars 61A-61E. In this assembly of dashboard vehicle assembly 30, collars 61A-61E of gauge assemblies 41A-41E provide gauges 60A-60E with decorative borders around outer rims 73 of gauges 60A-60E defining an overall display configuration of dashboard vehicle assembly 30.

Figure 7:
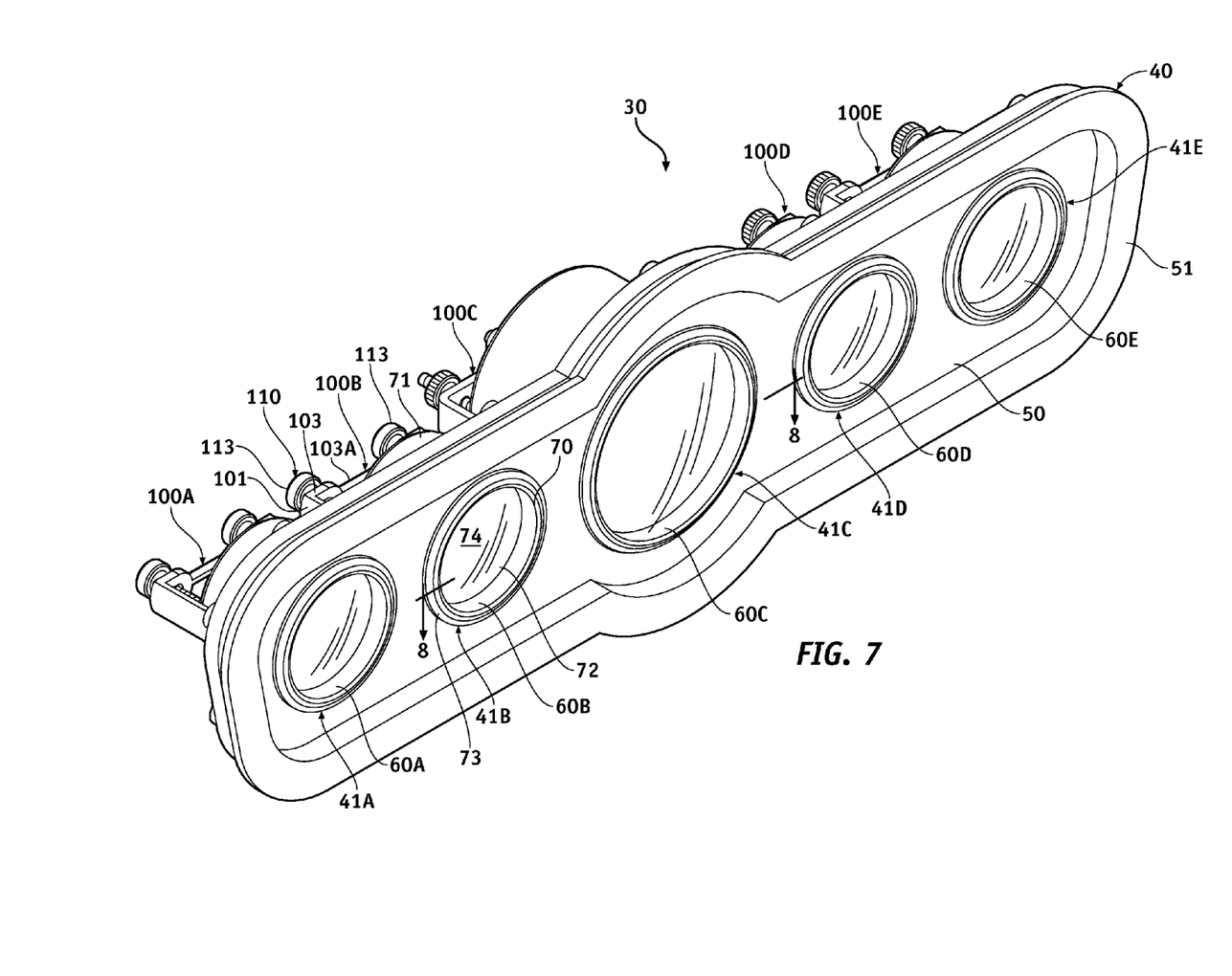
FIG. 7 is a view similar to that of FIG. 2 illustrating the dashboard instrument assembly as it would appear in a second display configuration.
Figure 8:
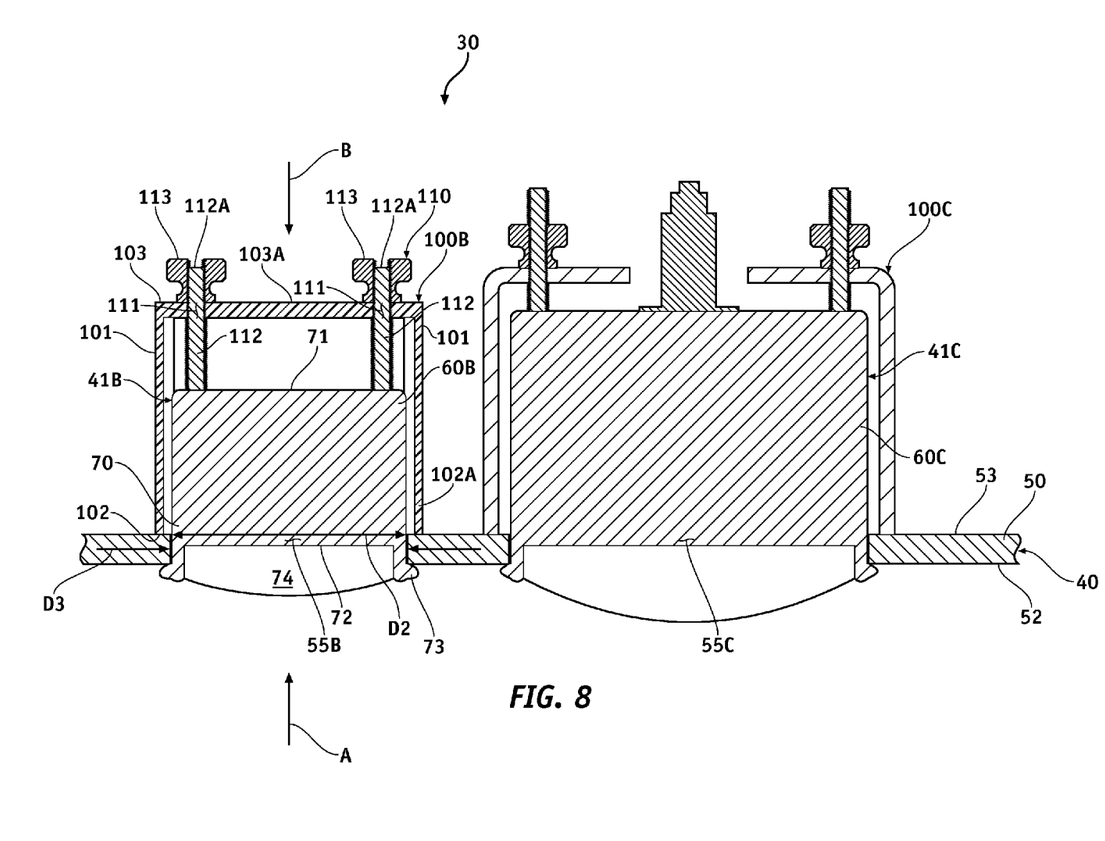
FIG. 8 is a section view taken along line 8-8 of FIG. 7.

Gauge assembly 41B may also be installed with faceplate 50 without collar 61B, which is another display configuration of gauge assembly 41B as is shown in FIGS. 7 and 8. In the installation gauge assembly 41B without collar 61B, gauge 60B is applied rear end 71 first into and through gauge-receiving opening 55B in the direction of arrowed line A in FIGS. 4 and 6. Gauge 60B has outer diameter D3 from outer rim 73 of front end 70 to rear end 71 that is somewhat less than inner diameter D2 of opening 55B, which permits gauge 60B to be passed into and through opening 55B rear end 71 first in the direction of arrowed line A in FIGS. 7 and 8, until front end 70 of gauge 60B is applied to opening 55B and outer rim 73, which confronts front face 52 of faceplate 50 outboard of gauge-receiving opening 55B makes direct contact with, and is seated directly against, front face 52 of faceplate 50, as is illustrated in FIG. 8. The direct contact between outer rim 73 of front end 70 of gauge 60B and front face 52 of faceplate 52 outboard of gauge-receiving opening 55B prevents further movement of gauge 60B in the direction of arrowed line A. In this installation of gauge 60B with respect to gauge-receiving opening 55B, outer rim 73 provides the only decoration for gauge 60B at front face 52 of faceplate 50 as is shown in FIG. 7 and this defines another decorative or display configuration of gauge assembly 41B. And so in this described alternate display configuration of gauge assembly 41B, front end 70 of gauge 60B is applied to gauge-receiving opening 55B, outer rim 73 of front end 70 of gauge 60B directly abuts front face 52 of faceplate 50 outboard of gauge-receiving opening 55B, measurement display 72 is located for viewing via viewing area 74 in a direction of arrowed line A toward front face 52 of faceplate 50, and gauge 60B extends rearwardly from rear face 53 of faceplate 50 from front end 70 of gauge 60B applied to gauge-receiving opening 55B to rear end 71 of gauge 60B, and outer rim 73 at front face 52 of faceplate 50 presents a decorative display configuration of gauge assembly 41B relative to front face 52 of faceplate 50, in accordance with the principle of the invention. To complete this installation of gauge assembly 41B and to secure gauge 60B and collar 61B in place to faceplate 50, bracket 100B is removably connected between gauge 60B and rear face 53 of faceplate 50 so as to clamp down outer rim 73 of front end 70 of gauge 60B against front face 52 of faceplate 50.

To install bracket 100B in the described display configuration of bracket assembly 41B without collar 61B, inner extremity 102 of arms 101 of bracket 100B is applied directly against rear face 53 of faceplate 50 in the direction of arrowed line B in FIGS. 4 and 6 on either side of gauge 60B, whereby bracket 100B extends rearwardly from inner extremity 102 and rear face 53 of faceplate 50 past rear end 71 of gauge 60B to outer extremity 103 of arms 101 of bracket 100B, and outer extremity 103 of arms 101 of bracket 100B is removably connected to gauge 60B so as to tighten inner extremity 102 of arms 101 of bracket 100B against rear face 53 of faceplate 50 in a direction that is toward and orthogonal with respect to rear face 53 of faceplate 50 in the direction of arrowed line B in FIGS. 7 and 8, and tighten outer rim 73 of gauge 60B against front face 52 of faceplate 50 in a direction that is toward and orthogonal with respect to front face 52 of faceplate 50 in the direction of arrowed line A in FIGS. 7 and 8, to tighten or otherwise clamp down outer rim 73 against front face 52 of faceplate 50. Again, outer extremity 103 of arms 101 of bracket 100B is preferably removably connected to gauge 60B with engagement assembly 110. Briefly, free ends 112A of threaded posts 112 are applied into and through openings 111 formed in outer extremity 103 of arms 101 of bracket 100B, and threaded nuts 113 are threaded onto the respective free ends 112A of threaded posts 112 and are then tightened via rotation against outer extremity 103 of arms 101 of bracket 100B so as to concurrently tighten inner extremity 102 of bracket 100B against rear face 53 of faceplate 50 in a direction that is toward and orthogonal with respect to rear face 53 of faceplate 50 in the direction of arrowed line B in FIGS. 7 and 8, and tighten outer rim 73 of gauge 60B against outer side 90 of flange 83 of collar 61B in a direction that is toward and orthogonal with respect to front face 52 of faceplate 50 in the direction of arrowed line A in FIGS. 7 and 8. To remove bracket 100B and remove gauge assembly 41B, one need on only reverse the above-described installation procedures for gauge assembly 41B and bracket 100B. FIG. 7 illustrates dashboard instrument assembly 30 as it would appear with gauge assemblies 40A-40E installed in the above-described display configuration, including gauges 60A-60E installed without their respective collars 61A-61E. In this assembly of dashboard vehicle assembly 30, outer rims 73 of gauges 60A-60E of gauge assemblies 41A-41E provide gauges 60A-60E with the decorative borders defining another overall display configuration of dashboard vehicle assembly 30.

According to the principle of the invention, each gauge assembly is configurable in two different display configurations, the first display configuration being in FIG. 2 showing a gauge 60 and a collar 61 assembly installed with faceplate 50, and the second display configuration being in FIG. 7 showing a gauge 60 and a collar 61 assembly installed with faceplate. This allows a user to configure each gauge assembly 41 in one of two different display configurations, in accordance with the principle of the invention. Moreover, dashboard instrument assembly 30 is configurable in two different display configurations, the first display configuration being in FIG. 2 showing the assembly of gauges 60A-60E and their corresponding collars 61A-61E installed with faceplate 50, and the second display configuration being in FIG. 7 showing the assembly of gauges 60A-60E installed with faceplate 50 without their corresponding collars 61A-61E. In an alternate embodiment, dashboard instrument assembly 30 may be configured with one or some of gauge assemblies 41 in one of the gauge assembly display configurations, and the remaining one or more of gauge assemblies 41 in the other gauge assembly display configuration. This allows a user to configure dashboard instrument assembly 30 in different display configurations, in accordance with the principle of the invention. After dashboard instrument assembly 30 into a desired display configuration, dashboard instrument assembly 30 may be installed into dashboard 21 of vehicle 20 as is shown in FIG. 1 and the gauges of gauge assemblies 41 wired or otherwise operatively coupled to vehicle 20 control systems, all in a customary and well-known manner, the details of which will readily occur to the artisan skilled in the art of dashboard instrument assembly installation and do not comprise part of the invention and are not discussed.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A vehicle dashboard instrument assembly, comprising:
a gauge faceplate includes a front face, a rear face, and a gauge-receiving opening through the gauge faceplate from the front face to the rear face;
a gauge includes a front end, having a measurement display and an outer rim encircling a viewing area to the measurement display, and a rear end;
a collar having an inner side directly abutting the front face of the gauge faceplate outboard of the gauge-receiving opening, and an outer side;
the front end of the gauge applied to the gauge-receiving opening, the outer rim of the gauge directly abutting the outer side of the collar, the measurement display located for viewing in a direction toward the front face of the gauge faceplate, and the gauge extends rearwardly from the rear face of the gauge faceplate from the front end of the gauge applied to the gauge-receiving opening to the rear end of the gauge;
a bracket removably connected between the gauge and the rear face of the gauge faceplate so as to clamp the collar between the outer rim of the gauge and the front face of the gauge faceplate; and
the collar decoratively encircles the outer rim of the gauge.

2. The vehicle dashboard instrument assembly according to claim 1, wherein the bracket encircles the gauge between the rear face of the gauge faceplate and the rear end of the gauge.

3. A vehicle dashboard instrument assembly, comprising:
a gauge faceplate includes a front face, a rear face, and a gauge-receiving opening through the gauge faceplate from the front face to the rear face;
a gauge assembly includes a bracket, a collar having an inner side and an outer side, and a gauge, the gauge includes a front end, having a measurement display and an outer rim encircling a viewing area to the measurement display, and a rear end;
the gauge assembly is configurable in first and second display configurations in relation to the gauge faceplate;
the first display configuration of the gauge assembly comprises:
the an inner side of the collar directly abutting the front face of the gauge faceplate outboard of the gauge-receiving opening;
the front end of the gauge applied to the gauge-receiving opening, the outer rim of the gauge directly abutting the outer side of the collar, the measurement display located for viewing in a direction toward the front face of the gauge faceplate, and the gauge extends rearwardly from the rear face of the gauge faceplate from the front end of the gauge applied to the gauge-receiving opening to the rear end of the gauge;
the bracket removably connected between the gauge and the rear face of the gauge faceplate so as to clamp the collar between the outer rim of the gauge and the front face of the gauge faceplate; and
the collar decoratively encircles the outer rim of the gauge;
the second display configuration of the gauge assembly comprises:
the front end of the gauge applied to the gauge-receiving opening, the outer rim of the gauge directly abutting the front face of the gauge faceplate outboard of the gauge-receiving opening, the measurement display located for viewing in a direction toward the front face of the gauge faceplate, and the gauge extends rearwardly from the rear face of the gauge faceplate from the front end of the gauge applied to the gauge-receiving opening to the rear end of the gauge; and
the bracket removably connected between the gauge and the rear face of the gauge faceplate so as to clamp down the outer rim of the gauge against the front face of the gauge faceplate outboard of the gauge-receiving opening.

4. The vehicle dashboard instrument assembly according to claim 3, wherein the bracket encircles the gauge between the rear face of the gauge faceplate and the rear end of the gauge when the bracket is removably connected between the gauge and the rear face of the faceplate.

5. A vehicle dashboard instrument assembly, comprising:
a gauge faceplate includes a front face, a rear face, and a gauge-receiving opening through the faceplate from the front face to the rear face;
a gauge includes a front end, having a measurement display and an outer rim encircling a viewing area to the measurement display, and a rear end;
a collar having an inner side directly abutting the front face of the gauge faceplate outboard of the gauge-receiving opening, and an outer side;
the front end of the gauge applied to the gauge-receiving opening, the outer rim of the gauge directly abutting the outer side of the collar, the measurement display located for viewing in a direction toward the front face of the faceplate, and the gauge extends rearwardly from the rear face of the gauge faceplate from the front end of the gauge applied to the gauge-receiving opening to the rear end of the gauge;
a bracket includes an inner extremity and an outer extremity;
the inner extremity of the bracket is applied directly against the rear face of the gauge faceplate on either side of the gauge and extends rearwardly from the rear face of the gauge faceplate past the rear end of the gauge to the outer extremity of the bracket removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the outer side of the collar in a direction that is toward and orthogonal with respect to the front face of the gauge faceplate, to clamp the collar between the outer rim of the gauge and the front face of the gauge faceplate; and the collar decoratively encircles the outer rim of the gauge.

6. The vehicle dashboard instrument assembly according to claim 5, wherein the outer extremity of the bracket is removably connected to the rear end of the gauge with an engagement assembly.

7. The vehicle instrument assembly according to claim 6, wherein the engagement assembly comprises:
   openings formed in the outer extremity of the bracket, threaded posts each extending rearwardly from the rear end of the gauge to a free, and threaded nuts; and
   the free ends of the threaded posts are applied into and through the openings formed in the outer extremity of the bracket, and each of the threaded nuts is threaded onto one of the threaded posts and is tightened against the outer extremity of the bracket.

8. The vehicle dashboard instrument assembly according to claim 5, wherein the inner extremity of the bracket encircles the gauge between the rear face of the gauge faceplate and the rear end of the gauge.

9. A vehicle dashboard instrument assembly, comprising:
   a gauge faceplate includes a front face, a rear face, and a gauge-receiving opening through the gauge faceplate from the front face to the rear face;
   a gauge assembly includes a bracket having an inner extremity and an outer extremity, a collar having an inner side and an outer side, and a gauge, the gauge includes a front end, having a measurement display and an outer rim encircling a viewing area to the measurement display, and a rear end;
   the gauge assembly is configurable in first and second display configurations in relation to the gauge faceplate;
   the first display configuration of the gauge assembly comprises:
      the an inner side of the collar directly abutting the front face of the gauge faceplate outboard of the gauge-receiving opening;
      the front end of the gauge applied to the gauge-receiving opening, the outer rim of the gauge directly abutting the outer side of the collar, the measurement display located for viewing in a direction toward the front face of the gauge faceplate, and the gauge extends rearwardly from the rear face of the gauge faceplate from the front end of the gauge applied to the gauge-receiving opening to the rear end of the gauge;
      the inner extremity of the bracket is applied directly against the rear face of the gauge faceplate on either side of the gauge and extends rearwardly from the rear face of the gauge faceplate past the rear end of the gauge to the outer extremity of the bracket removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the outer side of the collar in a direction that is toward and orthogonal with respect to the front face of the gauge faceplate, to clamp the collar between the outer rim of the gauge and the front face of the gauge faceplate; and
      the collar decoratively encircles the outer rim of the gauge; and
   the second display configuration of the gauge assembly comprises:
      the front end of the gauge applied to the gauge-receiving opening, the outer rim of the gauge directly abutting the front face of the gauge faceplate outboard of the gauge-receiving opening, the measurement display located for viewing in a direction toward the front face of the gauge faceplate, and the gauge extends rearwardly from the rear face of the gauge faceplate from the front end of the gauge applied to the gauge-receiving opening to the rear end of the gauge; and
      the inner extremity of the bracket is applied directly against the rear face of the gauge faceplate on either side of the gauge and extends rearwardly from the rear face of the gauge faceplate past the rear end of the gauge to the outer extremity of the bracket removably connected to the rear end of the gauge so as to tighten the inner extremity of the bracket against the rear face of the gauge faceplate 50 in a direction that is toward and orthogonal with respect to the rear face of the gauge faceplate, and tighten the outer rim of the gauge against the front face of the gauge faceplate outboard of the gauge-receiving opening in a direction that is toward and orthogonal with respect to the front face of the gauge faceplate, to clamp down the outer rim of the gauge against the front face of the gauge faceplate outboard of the gauge-receiving opening.

10. The vehicle dashboard instrument assembly according to claim 5, further comprising an engagement assembly for removably connecting the outer extremity of the bracket to the rear end of the gauge.

11. The vehicle instrument assembly according to claim 10, wherein the engagement assembly comprises:
   openings formed in the outer extremity of the bracket, threaded posts each extending rearwardly from the rear end of the gauge to a free, and threaded nuts; and
   when the engagement assembly removably connects the outer extremity of the bracket to the rear end of the gauge, the free ends of the threaded posts are applied into and through the openings formed in the outer extremity of the bracket, and each of the threaded nuts is threaded onto one of the threaded posts and is tightened against the outer extremity of the bracket.

* * * * *